[12] United States Patent
Chartier

(10) Patent No.: US 9,602,155 B2
(45) Date of Patent: Mar. 21, 2017

(54) TRANSCEIVER ELEMENT FOR AN ACTIVE, ELECTRONICALLY CONTROLLED ANTENNA SYSTEM

(71) Applicant: Airbus Defence and Space GmbH, Ottobrunn (DE)

(72) Inventor: Sebastien Chartier, Ulm (DE)

(73) Assignee: Airbus Defence and Space GmbH, Ottobrunn (DE)

( * ) Notice: Subject to any disclaimer, the term of this patent is extended or adjusted under 35 U.S.C. 154(b) by 0 days.

(21) Appl. No.: 14/420,933

(22) PCT Filed: Jul. 13, 2013

(86) PCT No.: PCT/DE2013/000378
§ 371 (c)(1),
(2) Date: Feb. 11, 2015

(87) PCT Pub. No.: WO2014/026663
PCT Pub. Date: Feb. 20, 2014

(65) Prior Publication Data
US 2015/0244412 A1 Aug. 27, 2015

(30) Foreign Application Priority Data
Aug. 16, 2012 (DE) .................. 10 2012 016 450

(51) Int. Cl.
*H04B 1/44* (2006.01)
*H04Q 3/28* (2006.01)
(Continued)

(52) U.S. Cl.
CPC ............. *H04B 1/44* (2013.01); *H01Q 3/28* (2013.01); *H01Q 3/34* (2013.01); *H01Q 3/38* (2013.01);
(Continued)

(58) Field of Classification Search
CPC . H04B 1/40; H04B 1/006; H04B 7/12; H04B 1/44; H01Q 3/34; H01Q 3/38; H01Q 21/0025; H01Q 3/28
See application file for complete search history.

(56) References Cited

U.S. PATENT DOCUMENTS 5,446,464 A    8/1995 Feldle
5,940,029 A *  8/1999 Ninomiya ........... G01S 13/4409
                                                342/154
(Continued)

FOREIGN PATENT DOCUMENTS

DE    696 30 512 T2    5/2004
EP    0 762 541 A2     3/1997
(Continued)

OTHER PUBLICATIONS

International Search Report (PCT/ISA/210) dated Nov. 25, 2013 with English translation (seven pages).
(Continued)

*Primary Examiner* — Andrew Wendell
*Assistant Examiner* — Maryam Soltanzadeh
(74) *Attorney, Agent, or Firm* — Crowell & Moring LLP

(57) ABSTRACT

A transceiver element for an active, electronically controlled antenna system includes a transmit path, a receive path and single-pole change-over switches having a common central connection and two connections for switching between the transmit path and the receive path. An amplitude controller and a phase adjuster are arranged between the common center connections of a first and second single-pole change-over switch. Single-pole multiple toggle switches having a common central connection and a number N of connections are present. The common central connection of the first and second single-pole change-over switch is connected to the common central connection of a first and a second single-pole multiple toggle switch respectively, and an amplitude
(Continued)

Figure 1:
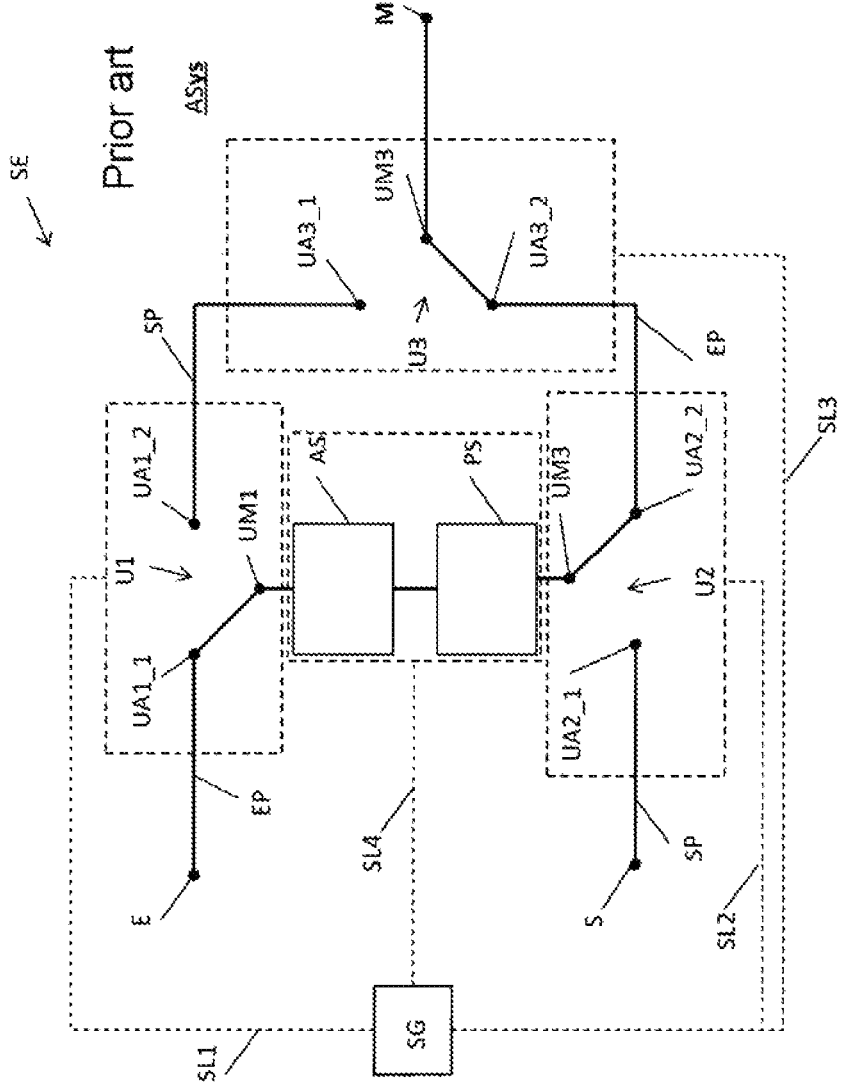

controller and a phase adjuster are connected between each connection of the number N of connections of the first multiple toggle switch and the second multiple toggle switch.

7 Claims, 2 Drawing Sheets

(51) Int. Cl.
    *H01Q 3/34*     (2006.01)
    *H04B 7/12*     (2006.01)
    *H04B 1/00*     (2006.01)
    *H01Q 3/28*     (2006.01)
    *H01Q 3/38*     (2006.01)
    *H01Q 21/00*     (2006.01)

(52) U.S. Cl.
    CPC ......... *H01Q 21/0025* (2013.01); *H04B 1/006* (2013.01); *H04B 7/12* (2013.01)

(56) References Cited

U.S. PATENT DOCUMENTS

| | | | | |
|---|---|---|---|---|
| 6,005,515 | A * | 12/1999 | Allen | H01Q 3/40 342/368 |
| 6,111,459 | A | 8/2000 | Nishijima et al. | |
| 6,710,742 | B1 * | 3/2004 | Meredith | H01Q 3/28 342/372 |
| 7,831,214 | B1 | 11/2010 | Stockmann | |
| 9,182,485 | B1 * | 11/2015 | Andrews | G01S 13/953 |
| 2006/0062340 | A1 * | 3/2006 | Zheng | H03L 7/0812 375/376 |
| 2008/0055946 | A1 * | 3/2008 | Lesso | H02M 3/158 363/63 |
| 2011/0006826 | A1 * | 1/2011 | Kang | H03H 11/20 327/254 |
| 2012/0263056 | A1 * | 10/2012 | Smith | H01Q 1/523 370/252 |
| 2014/0247634 | A1 * | 9/2014 | Takizawa | H02M 1/32 363/132 |

FOREIGN PATENT DOCUMENTS

| EP | 1 976 063 A1 | 10/2008 |
|---|---|---|
| FR | 2 930 845 A1 | 11/2009 |

OTHER PUBLICATIONS

Tan et al. "Low-Loss 2- and 4-bit TTD MEMS Phase Shifters Based on SP4T Switches" IEEE Transactions on Microwave Theory and Techniques, Jan. 1, 2003, pp. 297-304, vol. 51, No. 1, IEEE Service Center, Piscataway, New Jersey, XP001141821.

Cho et al. "CMOS-based Bi-directional T/R Chipsets for Phased Array Antenna" Microwave Symposium Digest (MTT), IEEE, Jun. 17, 2012, three pages, Kwangwoon University, Seoul, Republic of Korea, XP032217078.

* cited by examiner

TRANSCEIVER ELEMENT FOR AN ACTIVE, ELECTRONICALLY CONTROLLED ANTENNA SYSTEM

BACKGROUND AND SUMMARY OF THE INVENTION

Exemplary embodiments of the invention relate to a transceiver element for an active, electronically controlled antenna system.

Active, electronically controlled antenna systems consist, in principle, of the three subsystems:
A. RF splitter and combiner system (also referred to as RF supply system),
B. active transmitter modules, receiver modules or combined active transmit/receive modules, also referred to as T/R modules, arranged between the antenna-side outputs of the RF supply system and the antenna elements, and
C. the antenna elements which, together, cover a common antenna aperture.

A typical antenna system such as this contains a multiplicity of transmitter-antenna and/or receiver-antenna elements arranged linearly or in a matrix, which are only at a short distance apart from one another, usually a spacing of approximately $\lambda/2$, wherein $\lambda$ is the transceiver wavelength. A transceiver module is directly coupled to each of said transmitter-antenna and/or receiver-antenna elements.

In general, a transceiver module contains a transmit path with an RF transmission amplifier (also referred to as power amplifier) and a receive path containing at least one low-noise amplifier. In addition, at least transceiver changeover switches and an amplitude and phase adjuster are present in the transceiver module.

Amplitude and phase adjusters are used, first, to compensate the electrical manufacturing tolerances present between the individual transceiver modules and, secondly, to adjust in a predefinable manner the amplitude and phase differences for the transmission and/or reception waves in the case of adjacent transmitter-antenna and/or receiver-antenna elements connected to the transceiver modules. Hence, electrical adjustment and/or spatial pivoting of the transmit/receive radiation pattern of the antenna is possible.

One problem of known antenna systems is that the amplitude and phase adjusters can work reliably and effectively only within a predefined restricted frequency band. Outside of this frequency band to which the amplitude and phase adjuster of a transceiver module is tuned, meaningful signal evaluation is not possible. In the case of an antenna system with fixedly installed transceiver modules, it is not possible to change the frequency band.

German patent document DE 696 30 512 T2 describes a switchable power amplifier for transmitting RF signals at two different frequencies and two different output powers by temporal synchronization of four switches. For this purpose, two single-pole changeover switches are provided, the central connections of which are connected to one another via two further single-pole changeover switches.

A transceiver element which operates at the RF level and is used in electronically phased array antennas is known from European patent document EP 0 762 541 A2. The transceiver element has a transmit path, a receive path and two single-pole changeover switches with a common central connection and two connections for changing over between the transmit path and the receive path. Furthermore, the transceiver element comprises a multiple-throw switch, an amplitude adjuster and a phase adjuster.

U.S. Pat. No. 5,446,464 discloses a transceiver element a transmit path, a receive path with two single-pole changeover switches the central connections of which are connected to one another via an amplitude adjuster and a phase adjuster. The frequency band of the transceiver element is restricted to two narrow band frequency ranges of 5-6 GHz and 9.5-10.5 GHz.

Exemplary embodiments of the present invention are directed to a transceiver module with which it is possible to achieve reliable and effective signal evaluation over a frequency band which is of any width.

The transceiver element according to the invention for an active, electronically controlled antenna system comprises a transmit path, a receive path and single-pole changeover switches with a common central connection and two connections for changing over between the transmit path and the receive path, wherein a plurality of amplitude adjusters and a plurality of phase adjusters are arranged between the common central connections of a first and a second single-pole changeover switch. Single-pole changeover switches are also referred to as single-pole double-throw (SPDT) switches.

The invention is distinguished in that single-pole multiple-throw switches with a common central connection and a number N of connections $A_{1,\ldots,N}$ are present, wherein the common central connection of the first or second single-pole changeover switch is connected to the common central connection of a first or a second single-pole multiple-throw switch and an amplitude adjuster $AS_{1,\ldots,N}$ and a phase adjuster $PS_{1,\ldots,N}$ are switched in each case between each connection $A_{1,\ldots,N}$ or connection $B_{1,\ldots,N}$ of the number N of connections of the first and second multiple-throw switches.

In this case, the amplitude adjusters $AS_{1,\ldots,N}$ and a phase adjuster $PS_{1,\ldots,N}$ form in each case amplitude adjuster and phase adjuster pairs that can be actuated by the two single-pole multiple-throw switches. Depending on the application of an antenna system, the properties of any single amplitude adjuster and phase adjuster pair can be used.

In one embodiment of the invention, the first and the second single-pole multiple-throw switches are interconnected such that the changeover of the first and the second single-pole multiple-throw switch to the amplitude adjuster $AS_{1,\ldots,N}$ and the phase adjuster $PS_{1,\ldots,N}$ takes place synchronously. As a result, it is ensured that each multiple-throw switch switches in each case to the same amplitude and phase adjuster pair in the event of a changeover of the first and second single-pole multiple-throw switches. Expediently, a control circuit is provided for this purpose.

In another embodiment of the invention, the amplitude adjusters $AS_{1,\ldots,N}$ and phase adjusters $PS_{1,\ldots,N}$ between the connections $A_{1,\ldots,N}$ and $B_{1,\ldots,N}$ of the first and second multiple-throw switches are in each case adjusted to different frequency bands. Expediently, the individual amplitude and phase adjuster pairs can be tuned to, for example, the L band, S band, C band, X band, Ku band, K band or Ka band, or partial bands therefrom or combinations of the bands and/or partial bands mentioned above. Of course, the amplitude and phase adjuster pairs can also be tuned to frequency bands outside of the stated frequency bands. As a result, it is possible to specify a multi-band antenna system.

In another embodiment of the invention, the number N of connections $A_{1,\ldots,N}$ and $B_{1,\ldots,N}$ of the first and second single-pole multiple-throw switches is 2, 3, 4, 5, 6 or 7. Expediently, the number N of connections $A_{1,\ldots,N}$ or $B_{1,\ldots,N}$ of the first or second single-pole multiple-throw switches is 4, that is to say N=4, and so a single-pole four-throw (SP4T) switch known from the prior art can be used. SP4T switches known from the prior art have low losses.

The antenna system according to the invention is distinguished in that the spacing of the transceiver elements is less than $\lambda/2$, wherein $\lambda$ is the wavelength of that band with the highest frequency that is used in any of the transceiver elements. This means that, in the case of an antenna system with, for example, two SP4T multiple-pole switches and amplitude and phase adjuster pairs tuned to the S band, C band, X band and Ku band, the spacing of the individual transceiver elements in the antenna system is geared to the highest frequency in the Ku band.

In an embodiment of the antenna system according to the invention, a controller is present for controlling the first and second single-pole multiple-throw switches. As a result, it is ensured that each multiple-throw switch switches in each case to the same amplitude and phase adjuster pair in the event of a changeover of the first and second single-pole multiple-throw switches.

In another embodiment of the antenna system according to the invention, a controller is present for controlling the single-pole changeover switches for changing over between transmit and receive path.

In another embodiment of the antenna system according to the invention, a controller is present for controlling the amplitude adjuster and phase adjuster pairs in order to adjust the respectively desired amplitude or phase.

BRIEF DESCRIPTION OF THE DRAWING FIGURES

Figure 2:
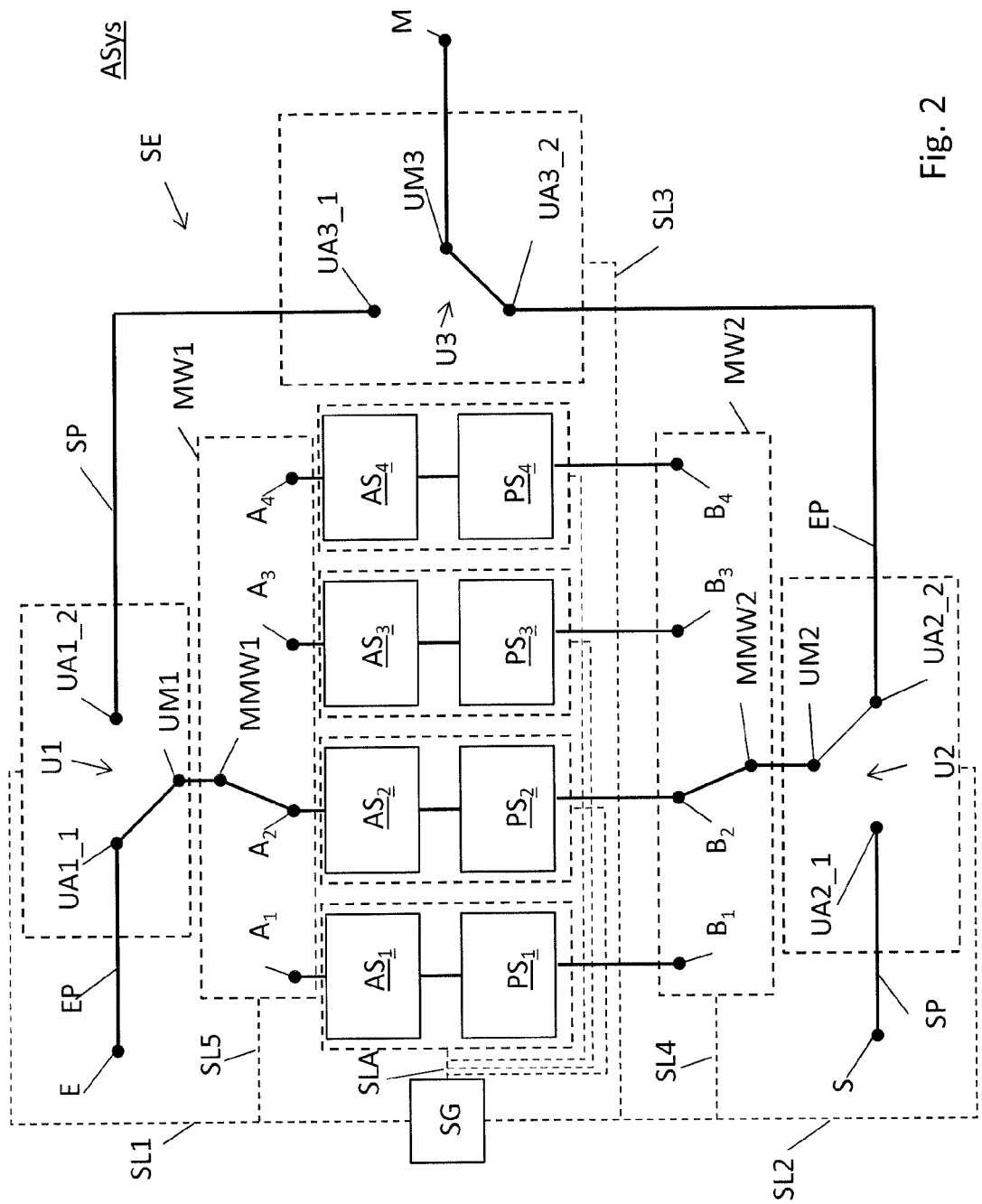

The invention is explained in more detail below on the basis of drawings, in which:

FIG. 1 shows a schematic design of a transceiver module according to the prior art, FIG. 2 shows a schematic design antenna system having a transceiver module according to the invention in a preferred embodiment.

In the figures, identical components and identical functions are denoted by identical reference signs in each case.

DETAILED DESCRIPTION

FIG. 1 shows a schematic design of a transceiver module SE according to the prior art. The transceiver module SE of the antenna system ASys has an input E for a receiver (not shown) and an output S for a transmitter (not shown). Furthermore, a connection M is present which leads to the down or up conversion mixer (not shown)

The transceiver module SE has three single-pole changeover switches U1, U2, U3. The single-pole changeover switches U1, U2, U3 make it possible to change over between a transmit path SP and a receive path EP in the transceiver module SE. Each single-pole changeover switch U1, U2, U3 has in each case a common central connection UM1, UM2, UM3. Furthermore, each single-pole changeover switch U1, U2, U3 has two connections UA1_1, UA1_2; UA2_1, UA2_2; UA3_1, UA3_2 by means of which the input E can be connected to the connection M via the receive path EP or the input S can be connected to the connection M via the transmit path SP.

Furthermore, a controller SG is provided to control the single-pole changeover switches U1, U2, U3 via the signal line SL1, SL2, SL3.

FIG. 1 shows by way of example the variant in which input E, that is to say the receiver, is connected to the connection SV via the receive path EP. For this purpose, the first single-pole changeover switch U1 is switched such that the connection UA1_1 is connected to the common central connection UM1 of the first single-pole changeover switch U1. Furthermore, the connection UA2_2 is connected to the common central connection UM2 of the second single-pole changeover switch U2. Finally, the connection UA1_2 is connected to the common central connection UM3 of the third single-pole changeover switch U3. The common central connection UM3 of the third single-pole changeover switch U3 is connected to the connection M.

The amplitude adjuster AS and the phase adjuster PS are switched between the common central connection UM1 of the first single-pole changeover switch U1 and the common central connection UM2 of the second single-pole changeover switch U2. Expediently, the amplitude adjuster AS and the phase adjuster PS are switched in a series connection between the common central connections UM1, UM2 of the first single-pole changeover switch U1 and the second single-pole changeover switch U2.

The controller SG is connected via the control line SL4 to the amplitude and phase adjuster pair AS, PS to adjust the amplitude and phase.

The amplitude adjuster AS and the phase adjuster PS are usually preset to a particular frequency band, for example the X band. Hence, the transceiver module SE can also reliably operate only within said preset frequency band.

FIG. 2 shows an antenna system having a transceiver module SE according to the invention in a preferred exemplary embodiment in which two single-pole multiple-throw switches MW1, MW2 with, for example, four connections A1, A2, A3, A4 or B1, B2, B3, B4 are switched between the common central connection UM1 of the first single-pole changeover switch U1 and the common central connection UM2 of the second single-pole changeover switch U2. The first single-pole multiple-throw switch MW1 has a common central connection MMW1, which is switchable to one of the connections A1, A2, A3, A4. Likewise, the second single-pole multiple-throw switch MW2 has a common central connection MMW2 which is switchable to one of the connections B1, B2, B3, B4.

In each case an amplitude adjuster and phase adjuster pair AS1, PS1; AS2; PS2; AS3; PS3; AS4, PS4 are connected, expediently in each case in series, between the connections A1, A2, A3, A4 and B1, B2, B3, B4 of the first and second single-pole multiple-throw switches MW1, MW2.

In FIG. 2, by way of example, the common central connection MMW1 in the first single-pole multiple-throw switch MW1 is switched to the connection A2 and connected thereto and the common central connection MMW2 in the second single-pole multiple-throw switch MW2 is switched to the connection B2 and connected thereto. The two single-pole multiple-throw switches MW1, MW2 must expediently be switched such that an interconnected amplitude adjuster and phase adjuster pair AS1, PS1; AS2; PS2; AS3; PS3; AS4, PS4 is always switched between the two common central connections MMW1, MMW2 of the first and second single-pole multiple-throw switches MW1, MW2.

In the exemplary embodiment illustrated in FIG. 2, the first amplitude adjuster and phase adjuster pair AS1, PS1 is tuned, for example, to the S band; the second amplitude adjuster and phase adjuster pair AS2; PS2 is tuned to the C band; the third amplitude adjuster and phase adjuster pair AS3; PS3 is tuned to the X band; and the fourth amplitude adjuster and phase adjuster pair AS4, PS4 is tuned to the Ku band. Of course, any other frequency range is also conceivable. Moreover, the invention is not restricted to the use of four amplitude adjuster and phase adjuster pairs; rather, more or fewer can be used.

The antenna system illustrated in FIG. 2 has a controller SG which is connected to the first and the second single-pole multiple-throw switches MW1, MW2 via control lines SL4, SL5. The controller SG is connected to the single-pole changeover switches U1, U2, U3 via control lines SL1, SL2, SL3. The controller SG is connected to each of the amplitude adjuster and phase adjuster pairs AS1, PS1; AS2; PS2; AS3; PS3; AS4, PS4 via the multiple control line SLA.

By means of the controller SG, it is possible to control the two single-pole multiple-throw switches MW1, MW2 and the three single-pole changeover switches U1, U2, U3 and the amplitude adjuster and phase adjuster pairs AS1, PS1; AS2; PS2; AS3; PS3; AS4, PS4 such that, depending on the application, it is possible to change over between the individual amplitude adjuster and phase adjuster pairs, between the amplitude and phase states and between receive and transmit path.

The controller SG comprises a plurality of control circuits (not shown), wherein a control circuit is present to control the two single-pole multiple-throw switches MW1, MW2, a control circuit is present to control the three single-pole changeover switches U1, U2, U3 and a control circuit is present to control the amplitude adjuster and phase adjuster pairs AS1, PS1; AS2; PS2; AS3; PS3; AS4, PS4.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A transceiver element for an active, electronically controlled antenna system, the transceiver element comprising:
   a transmit path;
   a receive path;
   at least first and second single-pole changeover switches with a common central connection and two connections for changing over between the transmit path and the receive path;
   a plurality of amplitude adjusters and a plurality of phase adjusters arranged between the common central connections of a first and a second single-pole changeover switch; and
   single-pole multiple-throw switches with a common central connection and a number N of connections,
   wherein the common central connection of the first or second single-pole changeover switch is connected to the common central connection of a first or a second single-pole multiple-throw switch and an amplitude adjuster and a phase adjuster are switched in each case between each connection of the number N of connections of the first and second multiple-throw switches.

2. The transceiver element of claim 1, wherein the first and the second single-pole multiple-throw switches are interconnected such that the changeover of the first and the second single-pole multiple-throw switch to the amplitude adjuster and the phase adjuster occurs synchronously.

3. The transceiver element of claim 1, wherein the amplitude adjusters and phase adjusters between the connections are each adjusted to different frequency bands.

4. The transceiver element of claim 3, wherein the different frequency bands include L band, S band, C band, X band, Ku band, K band or Ka band, or partial bands therefrom.

5. The transceiver element of claim 1, wherein the number N of connections of the first and second single-pole multiple-throw switches is 2, 3, 4, 5, 6 or 7.

6. An antenna system, comprising:
   a plurality of transceiver elements, each comprising
      a transmit path;
      a receive path;
      at least first and second single-pole changeover switches with a common central connection and two connections for changing over between the transmit path and the receive path;
      a plurality of amplitude adjusters and a plurality of phase adjusters arranged between the common central connections of a first and a second single-pole changeover switch; and
      single-pole multiple-throw switches with a common central connection and a number N of connections,
      wherein the common central connection of the first or second single-pole changeover switch is connected to the common central connection of a first or a second single-pole multiple-throw switch and an amplitude adjuster and a phase adjuster are switched in each case between each connection of the number N of connections of the first and second multiple-throw switches,
      wherein the amplitude adjusters and phase adjusters between the connections are each adjusted to different frequency bands,
   wherein spacing of the transceiver elements is less than $\lambda/2$, wherein $\lambda$ is the wavelength of that band with the highest frequency used in any of the transceiver elements.

7. The antenna system of claim 6, further comprising:
   a controller configured to control the first and second single-pole multiple-throw switches, the three single-pole double-throw switches and the amplitude adjusters and phase adjusters.

* * * * *